(12) United States Patent
Inagaki et al.

(10) Patent No.: US 7,555,869 B2
(45) Date of Patent: Jul. 7, 2009

(54) GLASS RUN FOR MOTOR VEHICLE

(75) Inventors: Satoshi Inagaki, Nishikasugai-gun (JP); Satoshi Toki, Nishikasugai-gun (JP); Shigeharu Ueyama, Toyota (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 335 days.

(21) Appl. No.: 11/280,809

(22) Filed: Nov. 17, 2005

(65) Prior Publication Data

US 2006/0107601 A1    May 25, 2006

(30) Foreign Application Priority Data

Nov. 22, 2004   (JP) .............................. 2004-336915

(51) Int. Cl.
*E06B 7/16* (2006.01)

(52) U.S. Cl. ........................ 49/479.1; 49/441
(58) Field of Classification Search ................ 49/475.1, 49/479.1, 440, 441
See application file for complete search history.

(56) References Cited

U.S. PATENT DOCUMENTS

| | | | |
|---|---|---|---|
| 4,894,953 A | 1/1990 | Nozaki | |
| 4,910,919 A | 3/1990 | Kisanuki et al. | |
| 5,127,193 A | 7/1992 | Okada et al. | |
| 5,195,274 A * | 3/1993 | Mishima et al. | 49/441 |
| 5,636,895 A * | 6/1997 | Ito et al. | 296/146.9 |
| 6,115,969 A | 9/2000 | Nozaki | |
| 6,243,989 B1 | 6/2001 | Nozaki | |
| 6,395,355 B1 | 5/2002 | Nakajima et al. | |
| 7,294,386 B2 * | 11/2007 | Murase et al. | 428/99 |

FOREIGN PATENT DOCUMENTS

| | | |
|---|---|---|
| JP | A-59-089249 | 5/1984 |
| JP | A-598-089249 | 5/1984 |
| JP | A-04-063721 | 2/1992 |
| JP | A-4-260814 | 9/1992 |
| JP | A-08-216694 | 8/1996 |
| JP | A-2000-158950 | 6/2000 |
| JP | A-2000-203270 | 7/2000 |
| JP | A-2001-233059 | 8/2001 |

OTHER PUBLICATIONS

Office Action dated Jan. 9, 2009 in corresponding Japanese Patent Application No. 2004-336915.

* cited by examiner

*Primary Examiner*—Jerry Redman
(74) *Attorney, Agent, or Firm*—Posz Law Group, PLC

(57) ABSTRACT

A glass run for use in a motor vehicle includes an outside wall, an inside wall and a bottom wall and has a generally U-shaped cross-section. An outside seal lip and an inside seal lip respectively project from open ends of the outside wall and the inside wall to extend into an interior of the glass run. An outside cover lip and an inside cover lip respectively project from the open ends of the outside wall and the inside wall for covering an outside end and an inside end of the door frame. And a corner part of the glass run, which is adapted to be attached to a corner of the door frame, has a lip extension along a projecting end of the outside cover lip for covering a joint between an upper frame and a vertical frame of the door frame.

1 Claim, 4 Drawing Sheets

GLASS RUN FOR MOTOR VEHICLE

CROSS-REFERENCE TO RELATED APPLICATION

This application is related to and claims priority from Japanese patent Application No. 2004-336915 incorporated herein by reference.

BACKGROUND OF THE INVENTION

1. Field of the Invention

The present invention relates to a glass run for attachment to an inner periphery of a door frame of a motor vehicle for guiding a door glass as it is raised and lowered.

2. Description of Related Art

As shown in FIG. 1, a glass run 10 is attached to an inner periphery of a door frame 12 of a vehicle door 14 for guiding a door glass 16 which is raised and lowered. FIG. 2 is a cross-sectional view taken along the line A-A of FIG. 1, and shows a conventional sealing structure around the door frame 12.

As shown in FIGS. 1 and 2, conventionally, the glass run 10 is fitted in a channel 40 formed in the door frame 12 to guide the door glass 16 upwardly and downwardly, and provide a seal between the door glass 16 and the door frame 12. The glass run 10 is formed by connecting extruded straight parts 18 providing a concaved part in an inside wall of the channel 40 at a corner thereof, with a molded corner part 20.

A door weather strip 22 is attached to an outer periphery of the door frame 12, and an opening trim weather strip 24 is attached to a flange provided in a door opening portion of a vehicle body, thereby sealing between the vehicle door 14 and the vehicle body.

As shown in FIGS. 2 and 3, the glass run 10 includes an outside wall 26, an inside wall 28 and a bottom wall 30, and has a generally U-shaped cross-section. An outside seal lip 32 extends from an open end of the outside wall 26 towards an interior of the glass run 10, and an inside seal lip 34 extends from an open end of the inside wall 28 towards the interior of the glass run 10. And an outside cover lip 36 extends from the open end of the outside wall 26 towards the bottom wall 30 along the outer surface of the outside wall 26, whereas an inside cover lip 38 extends from the open end of the inside wall 28 towards the bottom wall 30 along the outer surface of the inside wall 28 (Publication of unexamined patent application No. Hei4-260814 and Japanese patent No. 2607972, ex.).

The outside wall 26, the inside wall 28 and the bottom wall 30 are inserted in the channel 40 so as to contact inner surfaces thereof. An outer panel 42 of the door frame 12 and one side end of the channel 40 are inserted between the outside wall 26 and the outside cover lip 36, whereas an inner panel 44 of the door frame 12 and the other side end of the channel 40 are inserted between the inside wall 28 and the inside cover lip 38, thereby holding the glass run 10 in position.

A protrusion 46 is formed at a corner of the bottom wall 30 of the glass run 10 for preventing the slippage of the glass run 10 with the door glass 16. To attach the glass run 10 to a corner of the door frame 12, the bottom wall 30 of the glass run 10 is fitted in the corner of the door frame 12 to insert the protrusion 46 in an aperture provided at the corner of the door frame 12 for positioning the glass run 10.

Alternatively, the glass run may be attached to the corner of the door frame 12 by providing a concaved part in an inside wall of the channel 40 at a corner thereof, providing a convexed part in the corner part 20 of the glass run 10 at a joint between the inside wall 28 and the inside cover lip 38, and fitting the convexed part of the glass run 10 in the concaved part of the channel 40 (Publication of unexamined patent application No. Sho 59-89249, ex.).

In the former case, the protrusion 46 must be inserted in the aperture provided in the channel 40 only by touch or feeling so that the aperture is required to have a greater diameter than that of the protrusion 46. Consequently, after attaching the glass run 10 to the channel 40, the aperture is not completely closed with the protrusion 46 and a space remains unclosed therewith.

When the door glass 16 is elevated while sliding between the outside seal lip 32 and the inside seal lip 34, an upper end of the door glass 16 enters the interior of the glass run 10 and contacts the bottom wall 30 thereof. As shown in FIG. 1, the door frame 12 extends obliquely and upwardly from a front end to a rear end thereof, and the glass run 10 is attached to the door frame 12 thus arranged in an obliquely upwardly inclining state. Accordingly, when the door glass 16 is elevated and the upper end thereof enters the interior of the glass run 10, the glass run 10 is pulled obliquely upwardly. Consequently, the glass run 10 slips obliquely upwardly, because the space remains unclosed in the aperture provided at the corner of the door frame 12.

A door mirror (not shown) is mounted on a front part of the vehicle door 14. In the front part of the vehicle door 14, a front part of an upper frame and an upper end of a short front vertical frame of the door frame 12 are joined at an obtuse angle to each other. And a joint between the upper frame and the front vertical frame of the door frame 12 is covered with the outside cover lip 36 and the inside cover lip 38 of the glass run 10.

When the door glass 16 is elevated, and the glass run 10 is pulled obliquely upwardly, these lips 36 and 38 also slip obliquely upwardly so that they may come out of the joint between the upper frame and the front vertical frame of the door frame 12.

In particular, when the outside cover lip 36 comes out of the joint between the upper frame and the front vertical frame of the door frame 12, rainwater and noise may intrude into a vehicle compartment by way of a gap between the door frame 12 and the glass run 10, and the joint of the door frame 12 is exposed to degrade the appearance around the joint of the door frame 12.

In the case of a door glass fixedly secured to the door, the door glass is held with a weather strip and is secured to the door frame, and a space between the door glass and the door frame is covered with a cover lip. In this case, in a corner part of the door, a gap may be formed between the door frame, etc. and the weather strip, and to cover this gap, a bulging part may be provided in the cover lip of the weather strip (Publication of unexamined patent application No. 2000-203270, ex.).

The weather strip for the fixed door glass, however, differs from the glass run in configuration and mounting method on the door frame. The weather strip for the fixed door glass, which is secured to the door frame, does not slip relative to the door frame.

SUMMARY OF THE INVENTION

It is an object of the present invention to provide a glass run for a motor vehicle, of which a cover lip is capable of surely covering a joint in a corner of a door frame along which a door glass is elevated and lowered, thereby preventing rainwater and noise from intruding into a vehicle compartment and improving the appearance around the corner of a door frame.

In accordance with a first aspect of the present invention, the glass run for use in a motor vehicle, which is provided along an inner periphery of a door frame of a vehicle door for guiding a door glass as it is raised and lowered, and includes extruded straight parts and a molded corner part adapted to be attached to a corner of the door frame, includes an outside wall, an inside wall and a bottom wall, and has a generally U-shaped cross-section. An outside seal lip and an inside seal lip respectively project from open ends of the outside wall and the inside wall to extend into an interior defined by the outside wall, the inside wall and the bottom wall, thereby sealing an end of the door glass. An outside cover lip and an inside cover lip respectively project from the open ends of the outside wall and the inside wall for covering an outside end and an inside end of the door frame. And a lip extension is provided along a projecting end of the outside cover lip in the molded corner part of the glass run for covering a joint between a front end of an upper frame of the door frame and an upper end of a vertical frame of the door frame.

With this arrangement, the glass run includes an outside wall, an inside wall and a bottom wall, and has a generally U-shaped cross-section. The outside wall and the inside wall respectively have an outside seal lip and an inside seal lip, each extending into an interior defined by the outside wall, the inside wall and the bottom wall, thereby sealing a periphery of the door glass so that, when the vehicle door is closed, the periphery of the door glass is inserted in the interior of the glass run having a U-shaped cross-section to be surely held with the glass run. Since the outside seal lip and the inside seal lip continuously contact the periphery of the door glass which is raised and lowered, these seal lips can continuously provide a seal between the door frame and the door glass.

Since the outside cover lip and the inside cover lip project from the open ends of the outside wall and the inside wall of the glass run for covering the outside end and the inside end of the door frame, the outside end and the inside end of the door frame can be covered and protected with the outside cover lip and the inside cover lip, and the appearance around the ends of the door frame can be improved.

Since the outside cover lip has the lip extension along a projecting end thereof for covering the joint between the front end of the upper frame and the upper end of the vertical frame of the door frame, the lip extension of the glass run can continuously cover the joint between the front end of the upper frame and the upper end of the vertical frame of the door frame when the door glass is elevated and inserted in the upper part of the glass run to pull the corner of the glass run obliquely and upwardly, whereby rainwater and noise can be prevented from intruding into a vehicle compartment and improving the appearance around the door frame.

In accordance with a second aspect of the present invention, the corner part of the glass run has a protrusion for insertion in an aperture provided in the channel of the door frame.

With this arrangement, upon mounting the glass run on the door frame, first, the corner part of the glass run is positioned on the corner of the door frame by inserting the protrusion provided in the corner part of the glass run in the aperture provided in the door frame. The glass run mounted can be prevented from greatly slipping relative to the door frame.

In accordance with a third aspect of the present invention, to facilitate the insertion of the protrusion of the glass run in the aperture provided in the door frame, the protrusion has a diameter which is less than that of the aperture in a longitudinal direction of the upper extruded straight part of the glass run such that when the protrusion is inserted in the aperture, a clearance is formed in the aperture against the protrusion, and the lip extension is formed to have a width which is not less than the width of the clearance.

With this arrangement, since the clearance is provided for facilitating the insertion of the protrusion in the aperture, the glass run can be readily mounted on the corner of the door frame by touch or feeling. And since the lip extension has a width which is not less than the width of the clearance, that is greater than the slippage of the corner part of the glass run, which may occur when the door glass is elevated and inserted in the upper part of the glass run to pull the corner of the glass run obliquely and upwardly, the vertical part of the lip extension of the glass run can surely cover the joint between the front end of the upper part and the upper end of the vertical part of the door frame.

In accordance with a fourth aspect of the present invention, the outside cover lip of the glass run is inserted in the space between the outside wall of the door frame and the garnish for covering a door mirror bracket.

With this arrangement, the outside cover lip can cover the space between the garnish and the door frame, thereby preventing rainwater and noise from intruding into the vehicle compartment, and improving the appearance around the glass run.

As described, in accordance with the present invention, since the corner part of the glass run includes the outside cover lip having a lip extension along a projecting end thereof, the lip extension of the glass run can continuously cover the joint between the front end of the upper frame and the upper end of the vertical frame of the door frame when the door glass is elevated and inserted in the upper part of the glass run to pull the corner part of the glass run obliquely and upwardly, whereby rainwater and noise can be prevented from intruding into a vehicle compartment and the appearance around the door frame can be improved.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
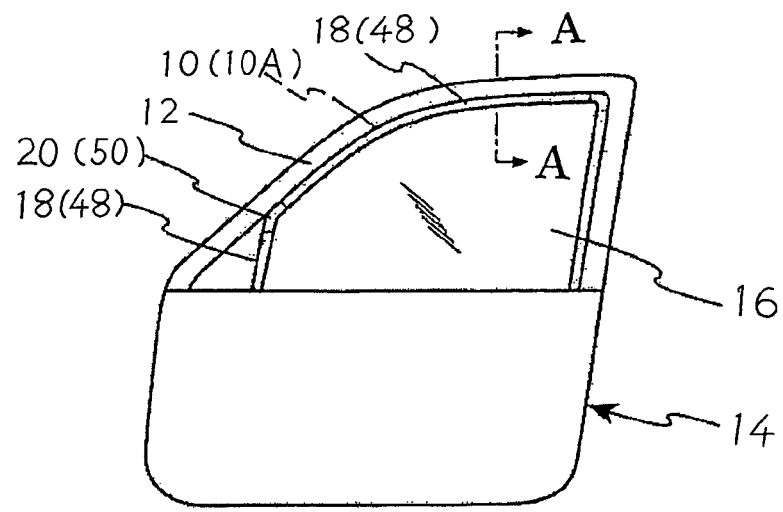
FIG. 1 is a front view of a door of a motor vehicle.
Figure 2:
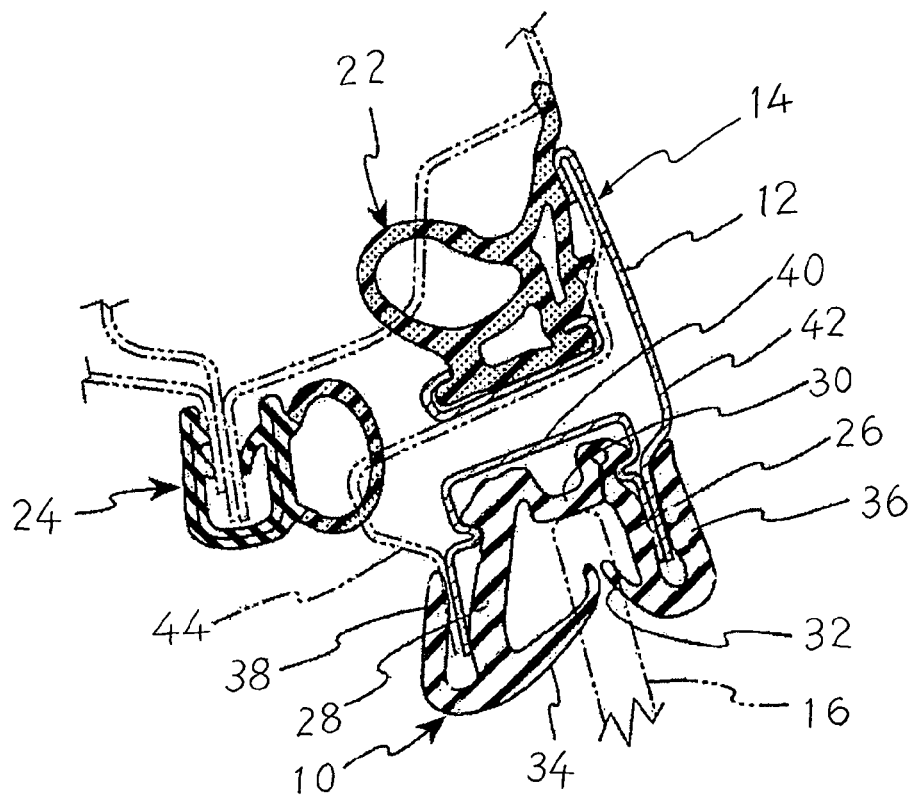
FIG. 2 is a cross-sectional view taken along the line A-A of FIG. 1, which shows a sealing structure around a door frame.
Figure 3:
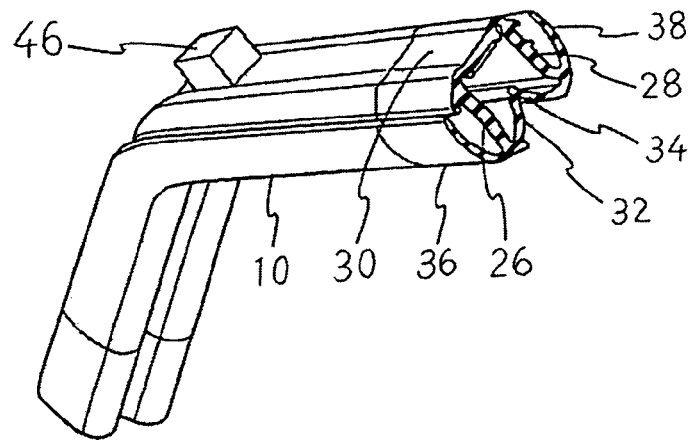
FIG. 3 is a perspective view of a corner part of a conventional glass run.

One embodiment of the present invention will be explained with reference to FIGS. 1 and 4 through 8. FIG. 1 is a front view of a door 14 of a motor vehicle. As shown, a door frame 12 is provided in an upper part of the door 14, and a door glass 16 is slidably attached along the door frame 12. A glass run 10A is attached to an inner periphery of the door frame 12 to guide the door glass 16 as it is raised and lowered, and seal between the door glass 16 and the door frame 12.

The glass run 10A includes straight parts 48 formed by extrusion and a corner part 50 for attachment to a corner 52 (FIG.8) of the door frame 12. The corner part 50 is formed by molding to connect the extruded straight parts 48 to each other. The extruded straight parts 48 includes an upper part for attachment to an upper frame of the door frame 12, a rear vertical part for attachment to a rear vertical frame of the door frame 12, and a front vertical part for attachment to a front vertical frame of the door frame 12. The upper frame of the door frame 12 extends from its front end to its rear end obliquely upwardly. A front part of the upper frame of the door frame 12 is connected to the front vertical frame thereof at an obtuse angle to each other. A channel 54 having a generally U-shaped cross-section is provided in the door frame 12 for mounting the glass run 10A.

The corner part 50 of the glass run 10A, which is adapted to be attached to the corner 52 of the door frame 12, is molded such that the straight extruded parts 48 conform to the upper frame and the front vertical frame of the door frame 12, respectively.

Figure 8:
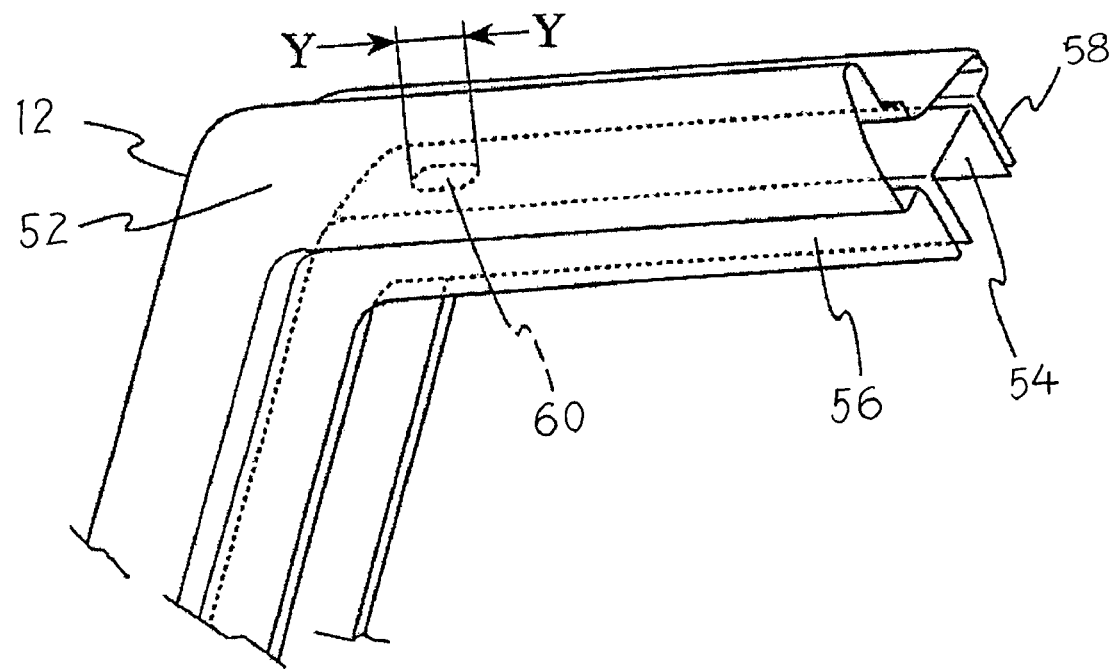
FIG. 8 is a perspective view of a corner of a door frame to which one embodiment of a glass run in accordance with the present invention is to be attached.

As shown in FIG. 8, the channel 54 is provided inside an outer panel 56 and an inner panel 58 composing the corner 52 of the door frame 12 such that an upper wall of the channel 54 makes an obtuse angle to side walls thereof, thereby holding the corner part 50 of the glass run 10A in position. An aperture 60 is provided in the channel 54 for holding the corner part 50 of the glass run 10A without slippage.

Figure 4:
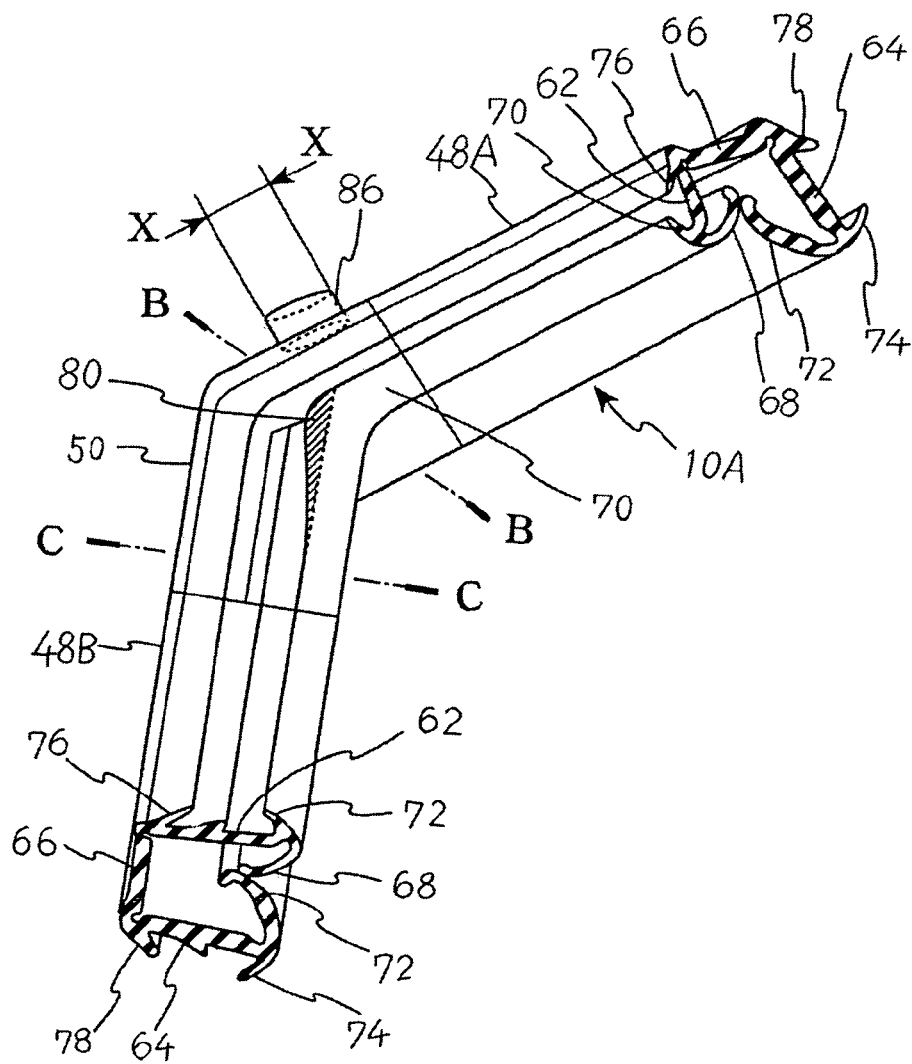
FIG. 4 is a partially sectional front view of one embodiment of a glass run in accordance with the present invention, which is prior to attachment to a door frame.

As shown in FIG. 4, extruded parts 48A and 48B of the glass run 10A for attachment to an upper frame 84 (FIG. 5) and a front vertical frame 82 (FIG. 5) of the door frame 12 respectively include an outside wall 62, an inside wall 64 and a bottom wall 66, and have a generally U-shaped cross-section. The cross-section of the glass run 10A is generally identical over the entire length thereof.

An outside seal lip 68 extends from an open end of the outside wall 62 into an interior of the glass run 10A, and an outside cover lip 70 extends from the open end of the outside wall 62 for covering an outside end of the channel 54. And an inside seal lip 72 extends from an open end of the inside wall 64 into an interior of the glass run 10A, and an inside cover lip 74 extends from the open end of the inside wall 64 for covering an inside end of the channel 54 and a protruding part 58 (FIG. 6) of the door frame 12 to improve the appearance seen from the interior of the vehicle body.

An outside holding lip 76 and an inside holding lip 78 respectively project from a joint between the outside wall 62 and the bottom wall 66, and a joint between the inside wall 64 and the bottom wall 66. When the glass run 10A is attached to the channel 54, the outside holding lip 76 and the inside holding lip 78 respectively contact bending parts provided in an outside wall and an insid wall of the channel 54 to seal the interior of the channel 54 and prevent the glass run 10A from coming out of the channel 54.

The inside wall 64 and the inside seal lip 72 are respectively formed greater and thicker than the outside wall 62 and the outside seal lip 68. With this arrangement, the door glass 16 can be positioned outwardly to reduce the difference in level between the door glass 16 and the door frame 12. Consequently, air resistance is decreased, occurrence of wind noise is reduced, and the aesthetic appearance is improved.

Facing surfaces of the outside seal lip 68 and the inside seal lip 72 are coated with a low sliding resistance material such as urethane resin, silicon resin, etc. When the door glass 16 is raised and lowered, the sliding resistance of the outside seal lip 68 and the inside seal lip 72 against the door glass 16 can be decreased to prevent the glass run 10A from slipping from a predetermined attached position.

The material exhibiting a low sliding resistance may be applied to an inner surface of the outside wall 62 and a rear surface of the outside seal lip 68. With this arrangement, the outside seal lip 68 can be prevented from sticking to the outside wall 62.

The material exhibiting a low sliding resistance, such as urethane resin, etc., is applied to an inner surface of the bottom wall 66, similarly to the seal lips 68 and 72, whereby the sliding resistance of the glass run 10A against the door glass 16 can be reduced.

Figure 6:
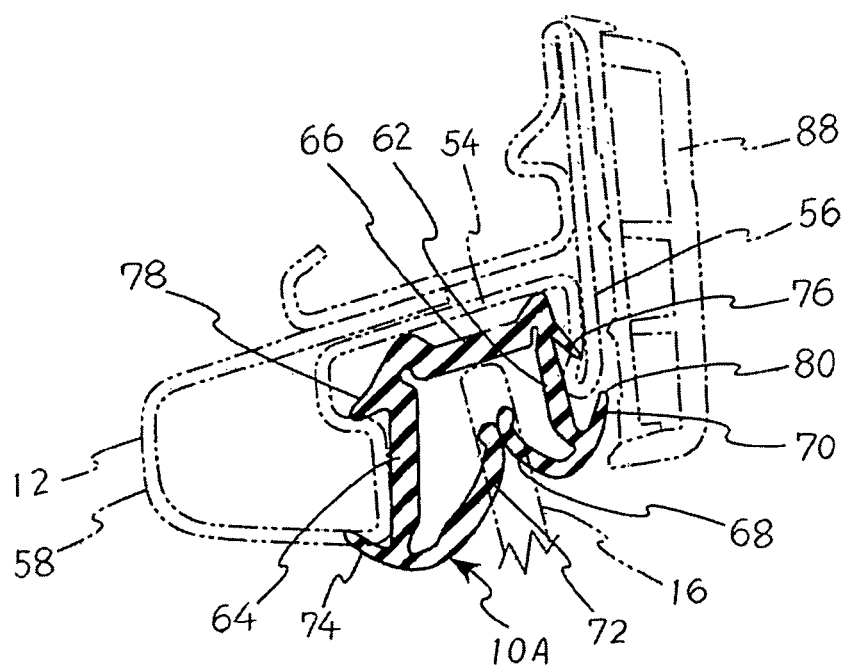
FIG. 6 is a cross-sectional view of a corner part of one embodiment of a glass run in accordance with the present invention, which is taken along the line B-B of FIG. 4.
Figure 7:
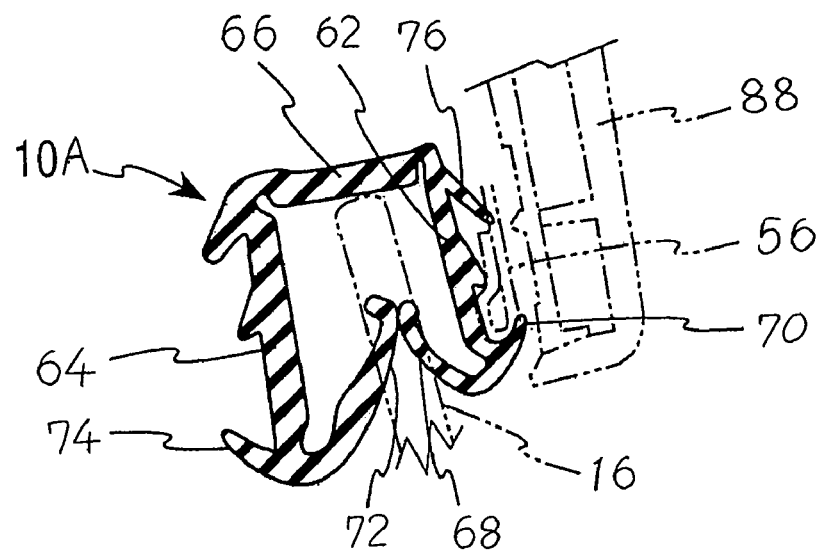
FIG. 7 is a cross-sectional view of a corner part of one embodiment of a glass run in accordance with the present invention, which is taken along the line C-C of FIG. 4.

Next, the corner part 50 of the glass run 10A will be explained. As shown in FIG. 4, a protrusion 86 having an elliptical or circular cross-section is provided in the corner part 50 of the glass run 10A for insertion in the aperture 60 (FIG. 8) provided in the channel 54. The aperture 60 has a configuration conforming to the cross-section of the protrusion 86. The long axis of the aperture 60, which extends in a longitudinal direction of the channel 54, is denoted by "Y". The corner part 50 of the glass run 10A is formed by molding to connect the straight parts 48A and 48B to each other into a configuration conforming to the corner 52 of the door frame 12. The cross-sectional shapes of the corner part 50 of the glass run 10A are illustrated in FIGS. 6 and 7. FIG. 6 is a cross-sectional view taken along the line B-B of FIG. 4, and FIG. 7 is a cross-sectional view taken along the line C-C of FIG. 4.

As shown in FIGS. 6 and 7, the corner part 50 of the glass run 10A includes an outside wall 62, an inside wall 64 and a bottom wall 66, and has a generally U-shaped cross-section, similarly to that of each of the straight parts 48A and 48B. The cross-sectional shape of the corner part 50 gradually varies from that of the upper straight part 48A to that of the vertical straight part 48B continuously.

An outside seal lip 68 extends from an open end of the outside wall 62 into an interior of the glass run 10A, and an outside cover lip 70 extends from the open end of the outside wall 62 to cover an outside end of the channel 54. And an inside seal lip 72 extends from an open end of the inside wall 64 into an interior of the glass run 10A, and an inside cover lip 74 extends from the open end of the inside wall 64 to cover an inside end of the channel 54 and the protruding part 58 of the door frame 12 to improve the appearance seen from the interior of the vehicle body.

Figure 5:
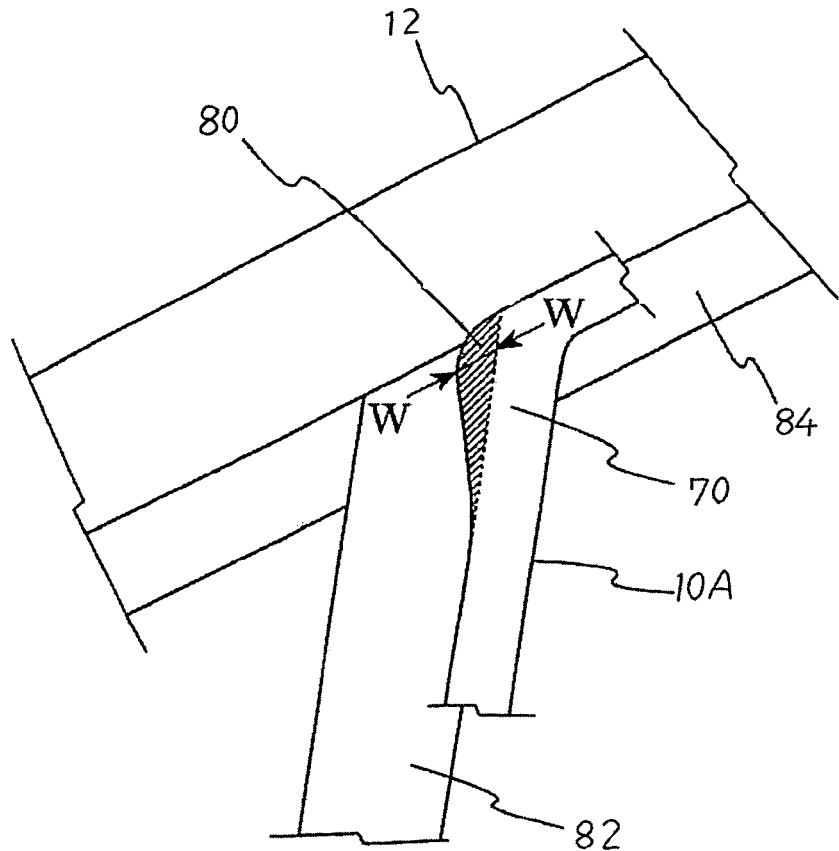
FIG. 5 is a partially cut away front view of a corner part of one embodiment of a glass run in accordance with the present invention, which is after attachment to a corner of a door frame.

As shown by slanting lines in FIGS. 4 and 5, in the corner part 50, the outside cover lip 70 has a lip extension 80 which extends in parallel with the outside wall 62 of the glass run 10A for covering the joint between the front vertical frame 82 and the upper frame 84 of the door frame 12.

In about a curved center of the corner part 50, as shown in FIG. 6, the outside cover lip 70 has the lip extension 80 so that the width of the outside cover lip 70 is made greater than that of the outside cover lip 70 shown in FIG. 7.

With this arrangement, when the glass run 10A is attached to the corner of the door frame 12, the joint between the front vertical frame 82 and the upper frame 84 of the door frame 12 can be covered with the lip extension 80 of the outside cover lip 70. And when the door glass 16 is elevated and inserted in the upper part 48A of the glass run 10A to pull the corner part 50 thereof obliquely upwardly, the lip extension 80 of the outside cover lip 70, which has a sufficiently great width, can continuously cover the joint between the front vertical frame 82 and the upper frame 84 of the door frame 12, thereby preventing rainwater and noise from intruding into the vehicle compartment and improving the outer appearance of the vehicle body.

As shown in FIG. 4, the protrusion 86 having a generally elliptical or circular cross-section protrudes upwardly from the bottom wall 66 of the glass run 10A. To facilitate the insertion of the protrusion 86 in the aperture 60 of the door frame 12, the aperture 60 is made greater than the protrusion 86. Where the protrusion 86 has a generally elliptical cross-section, and is inserted in the aperture 60 with a generally elliptical configuration, there is formed a clearance corresponding to the difference between the long axis (Y) of the aperture 60 and the long axis (X) of the protrusion 86.

When the door glass 16 is elevated, the glass run 10A is pulled by the door glass 16 and slips by the distance corresponding to this clearance.

As shown in FIGS. 4 and 5, the lip extension 80 of the glass run 10A extends from about a center of the corner part 50 along a vertical edge thereof. As shown in FIG. 5, the width of the lip extension 80 in the direction parallel to the upper frame 84 is a greatest width and is denoted by "W". The width "W" is made equal to or greater than the above-described clearance.

When the door glass 16 is elevated, and the corner part 50 of the glass run 10A slips in parallel to the upper frame 84, the lip extension 80 can continuously cover the joint between the upper frame 84 and the vertical frame 82 of the door frame 12.

The inside wall 64 of the glass run 10A has a height greater than that of the outside wall 62, and accordingly, the inside seal lip 72 is made to have a width greater than that of the outside seal lip 68, whereby the inside wall 64 of the glass run 10A can be surely sealed, and the door glass 16 can be positioned in an outwardly offset position.

A door mirror (not shown) is mounted on the front part of the vehicle door 14, and a garnish 88 for covering a door mirror bracket (not shown) is mounted outside the door frame 12. As shown in FIGS. 6 and 7 a distal end of the garnish 88 extends to cover the outside wall 62 of the glass run 10A with a space therebetween. The lip extension 80 of the outside cover lip 70 extends in this space and covers an end of the door frame 12 to improve the appearance therearound.

Upon attaching the glass run 10A to the door frame 12, first, the corner part 50 of the glass run 10A is fitted in the corner 52 of the door frame 12.

As shown in FIG. 8, a front part of the channel 54 of the upper frame 84 joins an upper end of the channel 54 of the front vertical frame 82 in the corner 52 of the door frame 12. When the glass run 10A is attached to the door frame 12, the corner part 50 of the glass run 10A is inserted in the channel 54 of the door frame 12, and the protrusion 86 is inserted in the aperture 60 of the door frame 12. Then, the straight parts 48A and 48B of the glass run 10A are inserted in the channels 54 of the upper frame 84 and the front vertical frame 82 of the door frame 12, respectively.

In the attaching state of the glass run 10A to the corner 52 of the door frame 12, the lip extension 80 of the outside cover lip 70 can cover the joint of the door frame 12.

The straight parts 48A and 48B, and the corner part 50 of the glass run 10A are composed of synthetic rubber such as EPDM rubber, thermoplastic elastomer such as olefin elastomer, or a soft synthetic resin such as soft vinyl chloride, etc.

The straight parts 48A and 48B are formed straight using an extruder.

In the case of synthetic rubber, after extrusion, it is heated for vulcanization in a vulcanization chamber with hot air, high frequency wave, etc., whereas in the case of thermoplastic elastomer or soft synthetic resin, it is cooled for solidification. Then, the extruded straight parts are cut to have a desired length.

Next, the corner part 50 is molded by placing ends of the extruded straight parts 48A and 48B, each having a desired length, in a mold, and injecting a solid material in a cavity of the mold. The molded corner part 50 has a generally identical cross-section to that of each of the extruded straight parts 48A and 48B. It is preferable that the material for the molded part is of the same kind as the material for the extruded parts. In the case of thermoplastic elastomer or soft synthetic resin, the molded part is welded to the extruded parts with heat and pressure of the material for the molded part, which is in a molten state when injected.

In the case of synthetic rubber, after injected into the mold, the mold is heated for vulcanization of the synthetic rubber. Due to vulcanization, the extruded parts and the molded part, which can be composed of an identical material or materials of the same kind, can become an integral body. Where the extruded parts are composed of synthetic rubber, the molded part can be composed of thermoplastic elastomer.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for use in a motor vehicle, which is provided along an inner periphery of a door frame of a vehicle door for guiding a door glass as it is raised and lowered, and includes extruded straight parts and a molded corner part adapted to be attached to a corner of the door frame comprising:

an outside wall, an inside wall and a bottom wall, which define a generally U-shaped cross-section;

an outside seal lip and an inside seal lip which respectively project from open ends of said outside wall and said inside wall to extend into an interior defined by said outside wall, said inside wall and said bottom wall, thereby sealing an end of the door glass;

an outside cover lip and an inside cover lip which respectively project from said open ends of said outside wall and said inside wall for covering an outside end and an inside end of the door frame;

a protrusion, having a generally elliptical cross-section, wherein the protrusion is provided in the molded corner part of said glass run for insertion in an aperture, which has a generally elliptical cross-section and is provided in a channel of the door frame; and a lip extension which is provided along a projecting end of said outside cover lip in the molded corner part of said glass run for covering a joint between a front part of an upper frame of the door frame and an upper end of a front vertical frame of the door frame, wherein said lip extension of said outside cover lip is adapted to be inserted in a space between an outside wall of the front vertical frame of the door frame and a garnish provided outside the front vertical frame, said protrusion has a long axis (X) that is less than a corresponding long axis (Y) of the aperture of the door frame, which extends in a longitudinal direction of the channel thereof such that when said protrusion is inserted in the aperture, a clearance corresponding to the difference between said long axis of the aperture and said long axis of said protrusion is formed in the aperture with respect to said protrusion, and said lip extension has a width (W) in a direction parallel to the upper frame, wherein the width is not less than said clearance, whereby the insertion of said protrusion in the aperture is facilitated, and said joint between the front part of the upper frame of the door frame and the upper end of the front vertical frame of the door frame can be surely covered with said lip extension of said outside cover lip.

* * * * *